US008208006B2

(12) United States Patent
Martin-Cocher et al.

(10) Patent No.: US 8,208,006 B2
(45) Date of Patent: Jun. 26, 2012

(54) METHOD AND SYSTEM FOR PROGRESSIVE DELIVERY AND SYNCHRONIZATION OF DISCRETE CONTENT IN RICH MEDIA SERVICES

(75) Inventors: Gaelle Martin-Cocher, Toronto (CA); Suresh Chitturi, Plano, TX (US)

(73) Assignee: Research In Motion Limited, Waterloo (CA)

( * ) Notice: Subject to any disclaimer, the term of this patent is extended or adjusted under 35 U.S.C. 154(b) by 1050 days.

(21) Appl. No.: 12/100,820

(22) Filed: Apr. 10, 2008

(65) Prior Publication Data
US 2009/0258594 A1 Oct. 15, 2009

(51) Int. Cl.
*H04N 7/14* (2006.01)
(52) U.S. Cl. .................. 348/14.12; 348/14.01
(58) Field of Classification Search .... 348/14.01–14.02, 348/14.07, 14.08, 14.09, 14.12–14.15; 709/203, 709/204; 370/259.26
See application file for complete search history.

(56) References Cited

U.S. PATENT DOCUMENTS

| 6,950,101 | B2 | 9/2005 | Hunt et al. |
| 2002/0089549 | A1 | 7/2002 | Munro et al. |
| 2007/0294333 | A1 | 12/2007 | Yang et al. |

FOREIGN PATENT DOCUMENTS

| KR | 10-2002-0075945 | 10/2002 |
| WO | 01/16764 | 3/2001 |

OTHER PUBLICATIONS

EP Application No. 08 154 581.6. EPO Communications pursuant to Article 94(3) EPC dated Nov. 19, 2009.
Scalable Vector Graphics (SVG) 1.1 Specification—W3C Candidate Recommendation Apr. 30, 2002—url: http://www.w3.org/TR/2002/CR-SVG11-20020430.
ISO/IEC 14496-20:2006 "Information technology—Coding of audio-visual objects—Part 20: Lightweight Application Scene Representation (LASeR) and Simple Aggregation Format (SAF)" dated Jan. 23, 2006.
Open Mobile Alliance—Mobile Broadcast Services Architecture Candidate Version 1.0—May 29, 2007.
Open Mobile Alliance—File and Stream Distribution for Mobile Broadcast Services Candidate Version 1.0—May 29, 2007.
W3C HTML5—Working Draft dated Jan. 22, 2008—url: http://www.w3.org/TR/2008/WD-html5-20080122/.
3rd Generation Partnership Project; Technical Specification Group Services and System Aspects; Dynamic and Interactive Multimedia Scenes—url: http://www.3gpp.org/ftp/Specs/html-info/26142.htm, Dec. 2007.
Open Mobile Alliance—Rich Media Environment Technical Specification—url: http://www.openmobilealliance.org/ftp/Public_documents/cd/MAE/Permanent_documents/OMA-TS-RME-V1_0-20071123-D.zip; Nov. 23, 2007.

(Continued)

*Primary Examiner* — Tuan Nguyen
(74) *Attorney, Agent, or Firm* — Fitch, Even, Tabin & Flannery, LLP

(57) ABSTRACT

A method for authoring and sending from a network element and receiving at a mobile device, rich media, the sending having the steps of checking whether the rich media includes discrete content; if yes, sending a low resolution version of the discrete content with the rich media; and subsequently sending a higher resolution version of the rich media. The receiving having the steps of receiving a low resolution version of the discrete content in the rich media; rendering the rich media; receiving a higher resolution fragment of the discrete content; and incrementally applying the higher resolution fragments to the low resolution version of the discrete content.

51 Claims, 10 Drawing Sheets

OTHER PUBLICATIONS

Kumar, Keeranoor G. et al., "The HotMedia Architecture: Progressive and Interactive Rich Media for the Internet", IEEE Transactions on Multimedia, vol. 3, No. 2, Jun. 2001, pp. 253-267.

Setlur, Vidya et al., "More: A Mobile Open Rich Media Environment", Multimedia and Expo, 2006 IEEE International Conference on, IEEE, PI, Jul. 1, 2006, pp. 2029-2032, XP031033264.

Exam Report for European Application No. 08154581.6, dated Feb. 23, 2009.

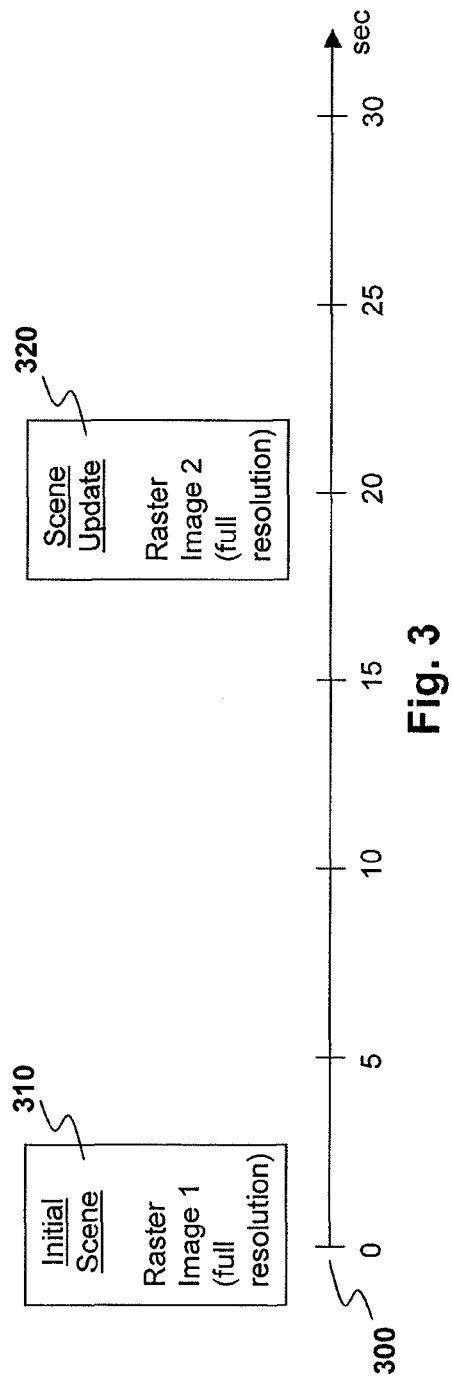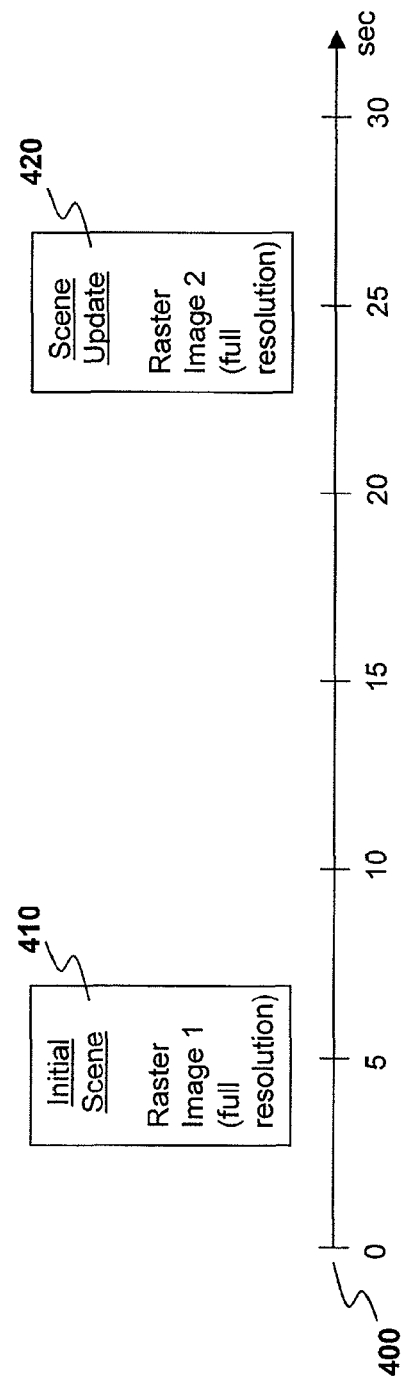

METHOD AND SYSTEM FOR PROGRESSIVE DELIVERY AND SYNCHRONIZATION OF DISCRETE CONTENT IN RICH MEDIA SERVICES

FIELD OF THE DISCLOSURE

The present disclosure relates to the delivery of rich media content and in particular to delivery of discrete content in rich media services.

BACKGROUND

Rich media content is generally referred to as content that is graphically rich and contains multiple media, including graphics, raster images, text, video and audio delivered through a single interface. Rich media content is becoming increasingly popular on the Internet and recently also in the wireless space.

Delivery of discrete content such as raster images in rich media services today is not done in a progressive nature. This results in a bad user experience.

BRIEF DESCRIPTION OF THE DRAWINGS

The present disclosure will be better understood with reference to the drawings in which:

FIG. 3 is a timeline showing the receipt of raster images;

FIG. 4 is a timeline showing rendering time for raster images;

DETAILED DESCRIPTION

Figure 1:
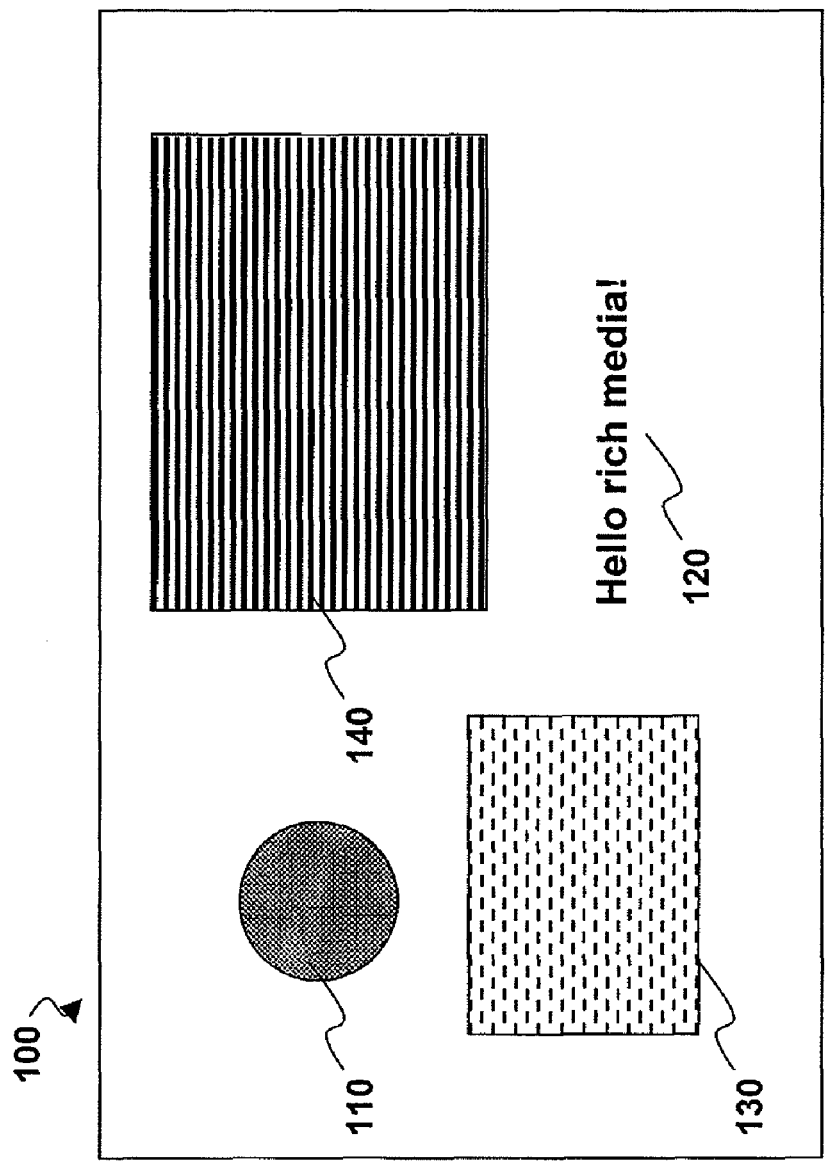
FIG. 1 is an exemplary screen representation of a rich media output.

The present disclosure provides a method for sending rich media comprising: checking whether the rich media includes discrete content; if yes, sending a low resolution version of the discrete content with the rich media; and subsequently sending a higher resolution fragment of the discrete content as an update.

The present disclosure further provides a network element for sending rich media comprising: a communications subsystem adapted to receive the rich media; a processor adapted to check whether the rich media includes discrete content; if yes, the processor adapted to send, through the communications subsystem, a low resolution version of the discrete content with the rich media; and subsequently send a higher resolution fragment of the rich media through the communications subsystem.

The present disclosure still further provides a method for receiving rich media comprising: receiving a low resolution version of the discrete content in the rich media; rendering the rich media; receiving a higher resolution fragment of the discrete content; and incrementally applying the higher resolution fragment to the low resolution version of the discrete content.

The present disclosure still further provides a mobile device for receiving rich media comprising: a communications subsystem adapted to receive low resolution discrete content in the rich media and higher resolution discrete content; and a processor adapted to render the rich media and further adapted to increment the low resolution version of the discrete content with higher resolution fragment of the discrete content.

In response to the demand for rich media content in the wireless space, coupled with increasing capabilities of mobile (wireless) devices to render such content, several standards organizations have begun working on rich media content technologies. These include:

3GPP DIMS

Dynamic and interactive media scenes (DIMS) is specified in the third generation partnership project (3GPP), which defines a dynamic rich media system, including a media type, its packaging, delivery, and interaction with the local terminal, user, and other local and remote sub-systems. Enhanced end-user experiences are provided by the coordinated management and synchronization of media and events, combined with end-user interaction. The DIMS media type can be used as a generic media type, allowing the creation of dynamic, interactive, rich media services and can also benefit from, or be used in association with, other media types such as audio codecs, video codecs, extended hypertext markup language (XHTML), among others.

The rich media system can be perceived as a client-server architecture, comprising three main components. These are the rich media server, the transport mechanism and the rich media client. The server takes as an input rich media content comprising scene descriptions, discrete data such as images and continuous data such as audio and video media. The scene description can be dynamically updated through scene updates. The rich media content can be encapsulated into a container format, containing additional information such as media synchronization, metadata and hint tracks for packetization. The system then utilizes various transport mechanisms for one-to-one and one-to-many protocols for download, progressive download and streaming scenarios. Examples of one-to-one mechanisms include hypertext transport protocol (HTTP), and Packet Switched Steaming Service (PSS). One-to-many protocols include, for example, multimedia broadcast multicast service (MBMS).

OMA RME

The open mobile alliance (OMA) rich media environment (RME) specification defines a framework that enables RME content to be distributed to, and displayed on, mobile devices. RME content consists of scenes of visual objects, such as video, images, animation and text, and audio objects that are composed together to give the user a richer experience. The system contains means to continually update the scene with new information replacing only the parts that are changing. It will thus be possible to keep part of the scene while updating other parts of the scene, thereby saving both communication bandwidth and device processing power. It is, however, also possible to replace the current scene with a new scene, if desired. Typical applications for RME are mobile television clients, dynamic application user interfaces, multiplayer gaming, and on-device portals.

The RME system consists of the RME client and the RME server. The RME client typically resides on the RME terminal and provides the capability to display RME data, handle dynamic updates to the RME scene, as well as local and remote interaction with the scene objects. Typically the server is the source of data and provides RME data to the client.

OMA BCAST

The open mobile alliance mobile broadcast services (B-CAST) specification, together with another specification comprising the mobile broadcast services enabler (B-CAST 1.0), define a technological framework and specify globally interoperable technologies for the generation, management and distribution of mobile broadcast services over different broadcast distribution systems. These include the third generation partnership project MBMS, the third generation partnership project 2 (3GPP2) broadcast and multicast services (BCMCS) and Internet protocol (IP) Datacast over digital video broadcast-handheld (DVB-H).

OMA B-CAST includes specifications for the following functions: service guide; service and content protection; file and stream distribution; terminal provisioning; service provisioning; notifications; and service interaction. Further, a common denominator for all B-CAST 1.0 technologies is that they are based on Internet protocol (IP) and technologies related to IP.

W3C SVG Tiny 1.2

The world wide web consortium (W3C) scalable vector graphics (SVG) is an extensible markup language (XML) based language for representing two dimensional vector graphics. In addition to scalability, SVG also offers interactivity, animations and the ability to imbed media such as raster images, audio and video content.

The SVG Tiny 1.2 specification is chosen to be the base content format for delivering rich media content in both 3GPP DIMS and OMA RME specifications. The key difference between DIMS and RME is that DIMS focuses primarily on the transport and delivery of rich media content, whereas RME specifications deal with application layer issues such as the integration of rich media with other modules on the terminal and user interface and event handling at the application level.

SVG-rich media content can be delivered with other content formats included. These include Synchronized Multimedia Integration Language (SMIL) and Compound Document Formats (CDF).

MPEG LASeR

The Moving Picture Experts Group (MPEG) Lightweight Application Scene Representation (LASeR) specification is based on the SVGT1.2 specification and defines the LASer commands.

LASeR commands are the core of the dynamic update functions of DIMS and RME. Similar technologies to the LASeR commands also exist in the W3C using document object model (DOM) events such as server-sent DOM events.

Additional rich media formats that may be utilized for the methods of the present system include Adobe Flash™ and Microsoft Silverlight™.

From the above, rich media content is generally made up of initial scene description format and then followed by a sequence of updates that are applied to the initial scene over time. This results in dynamic changes to the content. The scene description can also contain different media types, including graphics, text, raster images, video and audio content. The raster images are usually imbedded in the scene description, for example, in SVG content using base64 encoding schemes or referenced using a uniform resource locator (URL) scheme to a file residing locally within the device or located in the network.

Raster images or other discrete content or media does not get loaded in a progressive nature under RME and DIMS, which could result in a bad user experience. With raster images, for example, the full image needs to be loaded before rendering, which may delay the image rendering leading to a loss of synchronization or delay the complete rendering of the scene.

Raster images are utilized in the description below as an example of the loading of discrete content in a progressive way. However, this is not meant to be limiting and other discrete content that could be loaded progressively would be apparent to those skilled in the art.

Figure 2:
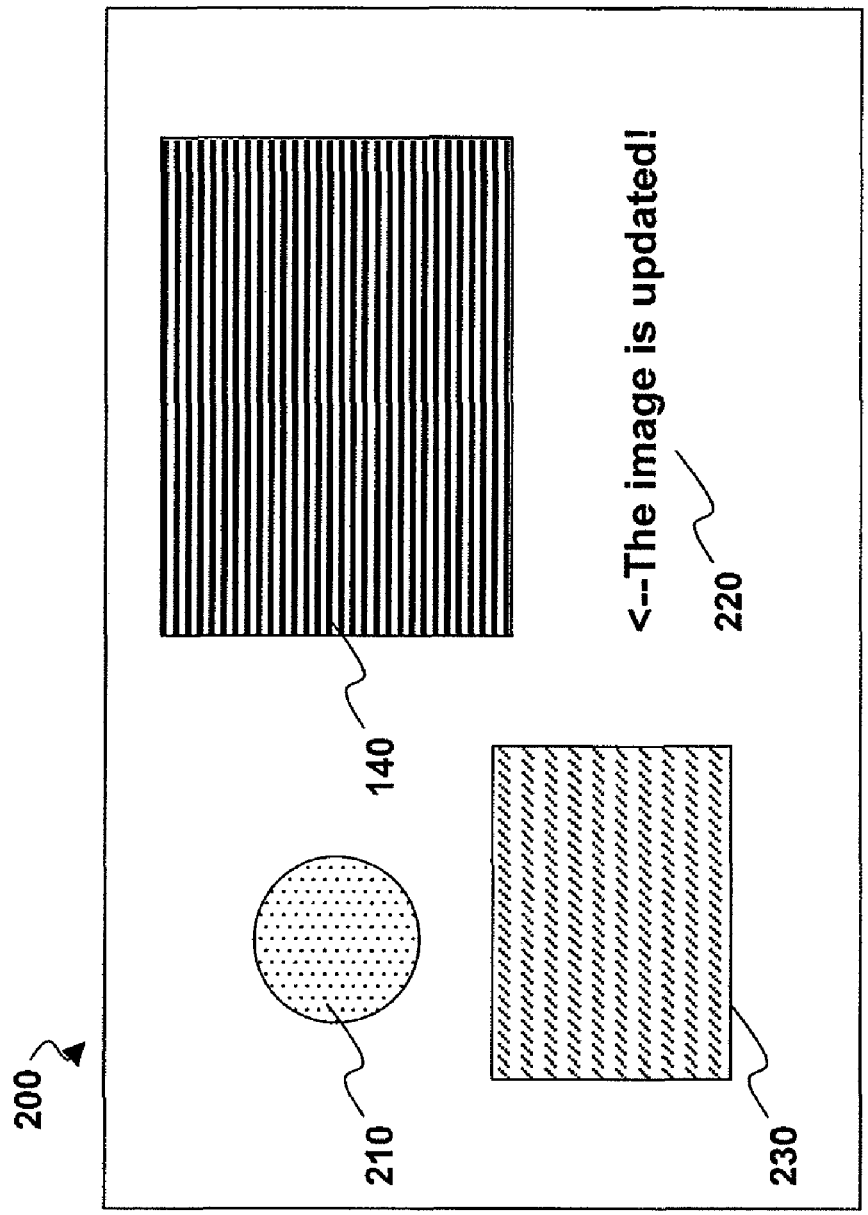
FIG. 2 is an exemplary screen representation showing an update of the rich media from FIG. 1.

Reference is now made to FIGS. 1 and 2, which show an initial SVG-rich media content followed by a dynamic update. Similar reference numerals are used for unchanged elements within FIGS. 1 and 2.

An initial scene description at time T seconds could be defined with XML as:

```
<?xml version="1.0"?>
<svg width="100%" height="100%"
xmlns="http://www.w3.org/2000/svg"
xmlns:xlink="http://www.w3.org/1999/xlink" baseProfile="tiny"
version="1.2">
   <circle id="myCircle" cx="20" cy="20" r="10" fill="red">
   <text id="myText" x="40" y="40">Hello rich media!</text>
   <image id="myImage"x="10" y="30" width="50" height="50"
xlink:href="Image1.png"/>
   <video xlink:href="myvideo.mp4" x="50" y="5" width="60"
   height="50" begin="0s"/>
</svg>
```

The above XML would be decoded and displayed as FIG. 1. In particular, screen 100 corresponds with the XML above.

A line-by-line analysis of the XML above shows that the first line defines the version of the XML.

The second line sets the parameters for the SVG, including the width, height, name space, the base profile and the version.

The fourth line, which starts "<circle id . . . " shows a shape 110 which is rendered onto screen 100. As indicated in the XML, the circle has an x,y coordinate of 20, 20, a radius of 10 and a fill color of red.

The next line, which starts <text id . . . " defines text 120. In this case, the text states "Hello rich media!" and is located at x,y coordinates 40, 40.

The next line of the XML starts "<image id . . . " and corresponds with image 130. In this case the XML defines that the image has a location of 10, 30, a width of 50, a height of 50 and a link to the image source. In the XML the image source is defined as "Image1.png".

The next line of the XML includes "<video . . . " and has a link to the video which is defined as "myvideo.mp4". The video is shown as 140 on screen 100 and it has an x,y location of 50, 5, a width of 60, a height of 50 and it begins at 0 seconds.

The above therefore shows rich media content with various aspects that is defined at time T seconds.

Referring to FIG. 2, FIG. 2 shows a screen 200, which is updated at time T+20 seconds. The XML code for the updating is defined as:

```
<lsr:Replace ref="myImage" attributeName="xlink:href"
value="Image2.png"/>
<lsr:Replace ref="myCircle" attributeName="fill" value="blue"/>
<lsr:Replace ref="myText" attributeName="textContent"
value="<--The image is updated!"/>
```

As defined in the XML above, screen 200 has various elements replaced. The first line indicates that image 230 is replaced with the value "Image2.png".

The second line of the XML indicates that shape 210 is replaced. In particular, the XML indicates that the fill color of shape 210 is now blue.

The third line of the XML indicates that the text attribute is changed to a new value, in this case, text 220 now reads "<—The image is updated!".

As will be appreciated, video 140 was not changed by the above and therefore remains the same and continues to play. An issue with the above is that raster images, specifically images 130 and 230, are not delivered in a progressive manner leading to a potentially bad user experience. For example, the image associated with the rich media content may not be displayed to the user at the indicated times T and T+20 seconds because the images are downloaded in their full resolution and the time needed to decode and render may exceed the display time indicated by the content author. This has an impact on the synchronization of raster images with other elements within the rich media scene, as illustrated by FIGS. 3 and 4 below.

Referring to FIG. 3, FIG. 3 shows the reception of images 130 and 230 of FIGS. 1 and 2 above. In FIG. 3 a timeline 300 starts at time T which is shown as 0 seconds, at which point the initial scene 310 with raster image 1 in its full resolution is received.

At time 20 seconds the scene is updated, as shown by box 320, with raster image 2 in its full resolution.

Referring to FIG. 4, the actual rendering time is different then the reception time due to the time needed to decode and display the full resolution/quality raster image. As a result, this causes a delay in the content appearing on the screen, leading to poor user experience.

Specifically, timeline 400 corresponds with timeline 300 of FIG. 3. Box 410 illustrates the actual rendering time of image 1 in its full resolution. Box 420 indicates the rendering time of raster image 2 in its full resolution. As shown, there is a difference of 5 seconds between the reception time for box 310 and the rendering time 410 from FIGS. 3 and 4 respectfully. As will be appreciated, this is merely an example and the rendering time will be depend on the image size, the application, the mobile device, the over the air connection, among other factors.

The difference in rendering between the reception time at box 320 and the rendering time 420 is also shown as 5 seconds. However, this is again dependent on image 2, the mobile device, the network connection, among other factors and difference in time is therefore merely meant as an example. Further, as will be appreciated, the difference between receiving image 1 and rendering image 1 can be different from the difference between receiving image 2 and the rendering of image 2.

The above could lead to bad user experiences due to synchronization problems. For example, one application for rich media is in education. Specifically, a lecture could be videotaped and images that are referred to by the lecturer could be displayed corresponding with the video. If the lecturer is referring to an image and that image does not display on the user's device for a time after the lecturer has started to refer to it, this leads to a poor user experience.

To address the synchronization issues with raster images, the systems and methods of the present disclosure deliver raster images and other discrete content in a progressive manner by sending these discrete content portions and chunks with increasing quality. In other words, a first lower quality image is sent at the outset, followed by additional bits of data to improve the quality of the image over time. This approach enables progressive delivery of raster images in the rich media scene, thereby allowing a smooth end-user experience.

Figure 5:
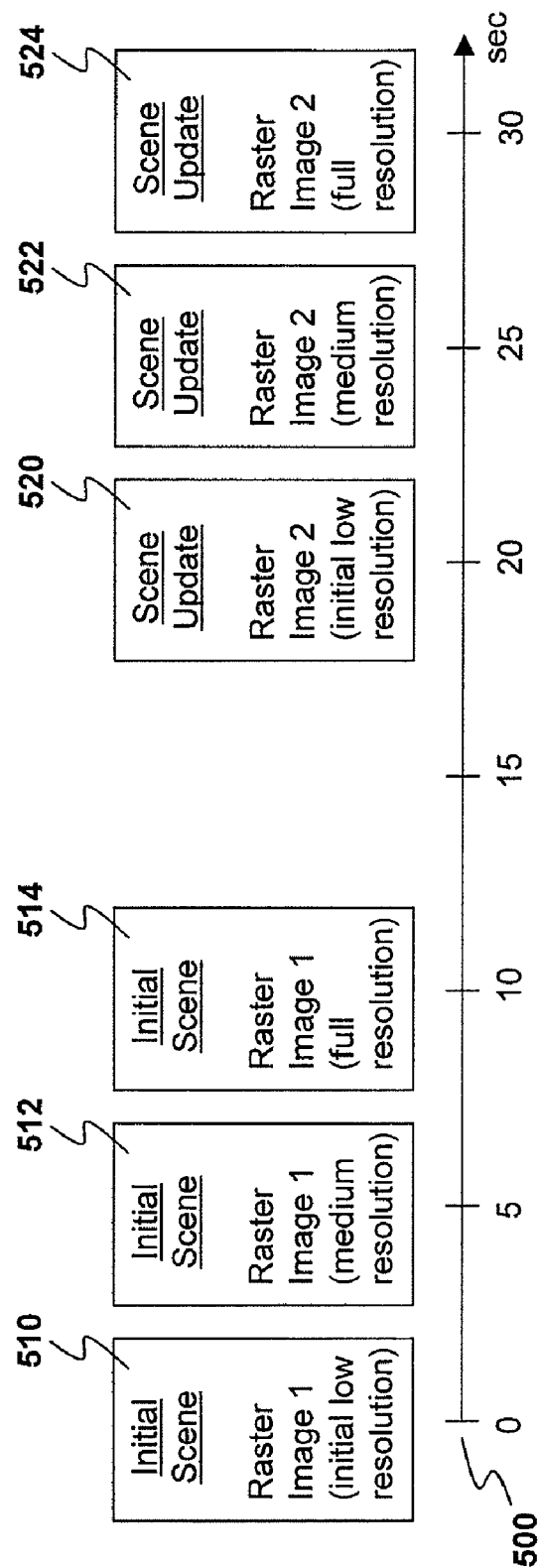
FIG. 5 is a timeline showing receipt and rendering of progressive resolutions of a raster images.

Reference is now made to FIG. 5.

FIG. 5 illustrates a timeline 500 showing progressive delivery and synchronization of raster image 1 and 2. In particular, at time 0 initial scene 510 includes a raster image 1 with initial low resolution. Since the image is low resolution it takes very little time to render and is rendered in synchronization with the remaining rich media content.

At time 5 seconds, raster image 1 receives additional bits and box 512 shows the raster image 1 now has a medium resolution.

By time 10 seconds, the raster image has received all of its bits and thus is displayed in full resolution, as shown by box 514.

At time 20 seconds, a scene update occurs and raster image 2 is rendered in its initial low resolution as shown by box 520.

The image 2 then receives additional bits and by time 25 seconds raster image 2 is of medium resolution as shown by box 522.

By time 30 the scene update includes a full resolution raster image 2 as shown by box 524.

As will be appreciated by those in the art, the illustration of FIG. 5 is merely meant as an example and shows discrete boxes for the improvement in resolution at specific times. The increase in resolution could, however, be continuous and the transition time from low resolution to full resolution may vary.

The above can be implemented in various ways. A first embodiment includes an in-band solution. In particular, the raster images or discrete content can be delivered in-band during streaming over RTP or other protocols by embedding them in line with the scene content. This is done, for example, by embedding the binary representation of the image using base 64 encoding as illustrated within the XML below as:

```
<image width="135" height="262"
xlink:href="data:;
base64,/9j/4AAQSkZJRgABAQEASABIAAD/2wBDAAUDBA
QEAwUEBAQFBQUGBwwIBwcHBw8LCwkMEQ8SEhEP......"/>
```

The above technique can be used in progressive delivery synchronization as follows. At time T, a low resolution version image is embedded in-band with the scene as follows:

```
<?xml version="1.0"?>
<svg width="100%" height="100%"
xmlns="http://www.w3.org/2000/svg"
xmlns:xlink="http://www.w3.org/1999/xlink" baseProfile="tiny"
version="1.2">
    <!----other scene elements can go here----->
    <image id="myImage" x="10" y="30" width="50" height="50"
xlink:href="=data:;
base64,/9j/4AAQSkZJRgABAQEASABIAAD/2wBDAAUDB
AQEAwUEBAQFBQUGBwwIBwcHBw8LCwkMEQ8SEhEP......"/>
</svg>
```

As is seen from the above, the image is defined, its location and size are defined and then the base64 encoding provides the image in-band.

At time T+5 seconds a medium resolution fragment of the image is sent utilizing the following XML:

```
<lsr:Add ref="myImage" attributeName="xlink:href"
    value="data:;base64,RgABAQEASABL....."/>
```

Thus a data chunk is added at this point to increase the resolution of the image.

Various ways to get the data chunk into the low-resolution image would be known to those skilled in the art. For example, the previous code with the low resolution version of the image could be enhanced by a chunk of code corresponding to the medium resolution fragment of the image. In this way, as each data chuck is applied to the previous image, the resulting image becomes a higher resolution image.

At T+10 seconds the full resolution fragment of the image is sent. Here another Add command is used to update the scene with the remaining progressive data chunk to further enhance the resolution and quality of the image to bring it to its full resolution and quality. The XML might look like:

```
<lsr:Add ref="myImage" attributeName="xlink:href" value="data:;base64,
cHBw8LCwkMEQ8SEhEP....."/>
```

In a further embodiment, discrete content required to be rendered with the rich media scene can also be delivered out of band by using an HTTP protocol for point to point delivery or another protocol such as File Delivery Over Unidirectional Transport (FLUTE) for broadcast delivery. As will be appreciated by those skilled in the art, there are essentially two modes of delivery in the rich media context. These are unicast and broadcast. Unicast refers to point-to-point connections such as HTTP and PSS. Broadcast is a one-to-many scenario, such as MBMS and DVB-H.

The out of band solution could therefore include an initial, low resolution version of the image at time T seconds. An example of the XML for this is:

```
<?xml version="1.0"?>
<svg width="100%" height="100%"
xmlns="http://www.w3.org/2000/svg"
xmlns:xlink="http://www.w3.org/1999/xlink" baseProfile="tiny"
version="1.2">
    <!----other scene elements can go here----->
    <image id="myImage"x="10" y="30" width="50" height="50"
xlink:href="Image1_low.png"/>
</svg>
```

As indicated above, the image a hypertext reference "Image1_low.png", which loads at time T seconds.

If FLUTE is used for delivery, the referenced hypertext image should be fetched from the File Delivery Table (FDT) as defined by FLUTE protocol.

At scene update 1 at 5 seconds a medium resolution fragment of the image is provided out of band. The XML for this is:

```
<lsr:Add ref="myImage" attributeName="xlink:href"
    value="Image1_medium.png"/>
```

As seen in the above, the image is defined as "Image1_medium.png", which is a reference to a medium resolution fragment of the image.

In the final time T+10 seconds the full resolution fragment of the image is loaded. An example of the XML for this as follows:

<lsr:Add ref="myImage" attributeName="xlink:href" value="Image1_full.png"/>

The href value equals "Image1_full.png", indicating that the out of band full resolution fragment of the image is loaded.

The signaling of progressive discrete content updates could be done through headers.

In one embodiment, a one-bit field may be assigned to RTP data headers to indicate that the RTP data unit contains an initial low-quality image. For example, in the current 3GPP DIMS specification, RTP data unit headers are described as below. The zero bit is reserved. This unused bit can be used to indicate the use of progressive delivery and synchronization of embedded raster images.

TABLE 1

| 0 | 1 | 2 | 3 | 4 | 5 | 6 | 7 |
|---|---|---|---|---|---|---|---|
| X |   | C | P | D | I | M | S |

If X is set to 1 this indicates that the current packet contains raster image content which will be delivered in a progressive manner. If X is set to 0 it indicates that no progressive enabled raster images are present.

If the X bit is set to 1, implementations need to be aware that the upcoming packets in the stream may carry data chunks to enhance the raster images delivered in the current packet.

A further embodiment could utilize slipstream technologies, as defined in US Patent Publication Number 20070294333, the contents of which are incorporated herein by reference, for the image progressive rendering. This publication shows progressive delivery of multimedia objects in a standalone mechanism for images only.

The slipstream technique would be applicable to the present disclosure only in the out-of-band mode, where the image references are included in the scene and scene updates, and the referenced images (or data chunks) are fetched from the separate out of band channel as described by the slipstream patent. As will be appreciated, US Patent Publication Number 20070294333 does not provide for rich media content and synchronization to a scene.

Figure 6:
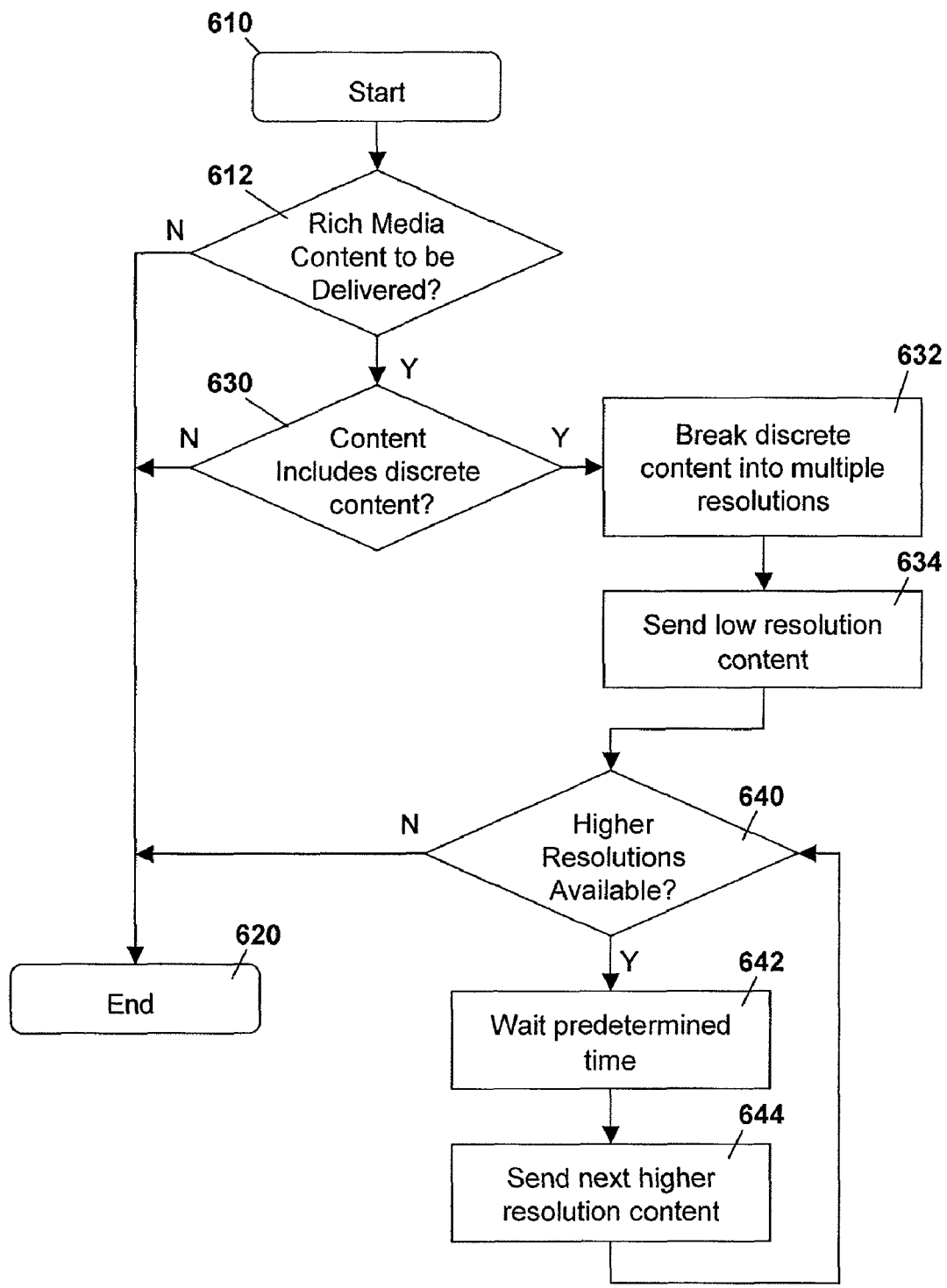
FIG. 6 is a flow diagram showing a network side process for sending rich media with progressive resolutions.

The above progressive delivery in rich media is illustrated further with reference to FIG. 6, which shows a flow diagram from a network perspective for delivering discrete media.

Referring to FIG. 6, the process starts at step 610 and proceeds to step 612 in which a check is made to determine whether rich media content needs to be delivered. If no, the process proceeds to step 620 and ends.

Conversely, from 612 if rich media needs to be delivered the process proceeds to step 630 in which a check is made to see whether the rich media includes discrete content. As will be appreciated by those skilled in the art, discrete content includes items such as raster images as described above.

If, in step 630 it is determined that there is no discrete content in the rich media content, the process proceeds to step 620 and ends. Otherwise, the process proceeds to step 632.

In step 632, the network breaks the discrete content into multiple resolution fragments. As will be appreciated, step 632 is optional and the discrete content may already be broken into multiple resolutions prior to being received by a network element. In this case, the process would proceed directly to step 634.

If step 632 is necessary, a processor on the network element could determine optimal resolutions for breaking the content down. The decision could be made based on the device to which the media is being sent, the network connection, among other factors.

Additionally the overall size of the discrete content might be small enough to not required being broken. A policy could be implemented to indicate that discrete content with size lower than X is not broken and send as is, where X is determined by for example the mobile device, network operator, content provider, service provider, or scene or scene update weight.

The examples above illustrated three resolution fragments, namely low, medium, and high. However, the present application is not meant to be limited three resolution fragments. In some cases two resolution fragments may be sufficient. In other words a low resolution and a full resolution. In other solutions more resolutions are required. The breaking step in step 632 could break the content into four, five or more resolution fragments.

From step 632, the process proceeds to step 634 in which the low resolution content is sent to the mobile device. As will be appreciated, the sending step in step 632 can be unicast in some embodiments or broadcast in other embodiments. Various standards for unicast or broadcast are known to those in the art, and are described above.

Further, the term "low-resolution content" is the lowest resolution version of the image that the breaking step of step 632 broke the content into. Alternatively, the "low-resolution content" is the lowest resolution version of the discrete content that was received by a network element if the discrete content was already broken into various resolution fragments.

The process then proceeds to step 640 in which a check is made to see whether higher resolution fragments are available. If yes, the process proceeds to step 642 in which the process waits for a predetermined amount of time. In some cases it is desirable to send the higher resolution fragment after a specific time interval. In other cases, the higher resolution fragment can be sent immediately. Therefore the time that is in step 642 can vary based on the network operator and mobile device requirements.

The process then proceeds to step 644 in which the next higher resolution fragment is sent to the mobile device.

From step 644 the process proceeds back to step 640 in which a check is made to see whether higher resolution fragments are available and if yes the process proceeds back through step 642 and step 644. Otherwise, the process proceeds to step 620 and ends.

Various alternatives to the above could be implemented. For example, if race conditions are to be avoided in the situation where an update is received prior to the highest resolution being sent, a check could be inserted between step 640 and 642 to determine whether an update is waiting. In this case, the process could proceed directly to step 620 and end in order to allow the update to be delivered starting from step 630.

In particular, when an update arrives, the process could proceed in the same way as described above. A decision could be made whether there is rich content media to be delivered in step 612. However, since it is an update this is going to be answered yes and the process proceeds to step 630 where a check is made to see whether the update includes discrete content. If yes, the process proceeds to step 632 and breaks the discrete content into multiple resolutions if required and then proceeds to step 634 in which the lowest resolution content update is sent. The process then proceeds to step 640, 642 and 644 as described above.

From a wireless device perspective, an exemplary process is described with reference to FIG. 7.

The process starts at step 710 and a check is made to see whether rich media is received at step 712. If no, the process ends at step 720. Conversely, if rich media has been received the process proceeds to step 730 and renders and displays the rich media.

From step 730, the process proceeds to step 740 in which a check is made to see whether a media update has been received. As will be appreciated, updates can be received by broadcast/push and/or requested explicitly by the client terminal. If an update is received, the process proceeds to step 750 and renders the update. Otherwise the process proceeds back to step 740 and continues to check whether a media update has been received.

As will be appreciated by those skilled in the art, the update received at step 740 can be a higher resolution fragment of a discrete media such as raster image. It can also be a scene update as described above.

In a further embodiment, the above can be modified by adding reliability to low-resolution version of images. In particular, to improve the reliability of data during streaming and to avoid retransmission, parts of the important rich media content is delivered by marking the packets as Random Access Point (RAP). The packets marked as RAP are typically encoded with a high Forward Error Correction (FEC) to increase the reliability of the content in the event of unreliable transport channels.

The initial low quality version of the image can be delivered in the RAP to increase the reliability in such cases. The remaining higher quality chunks may be delivered as non-RAP packets as they are not very critical but rather only used to enhance the content appeal.

Figure 8:
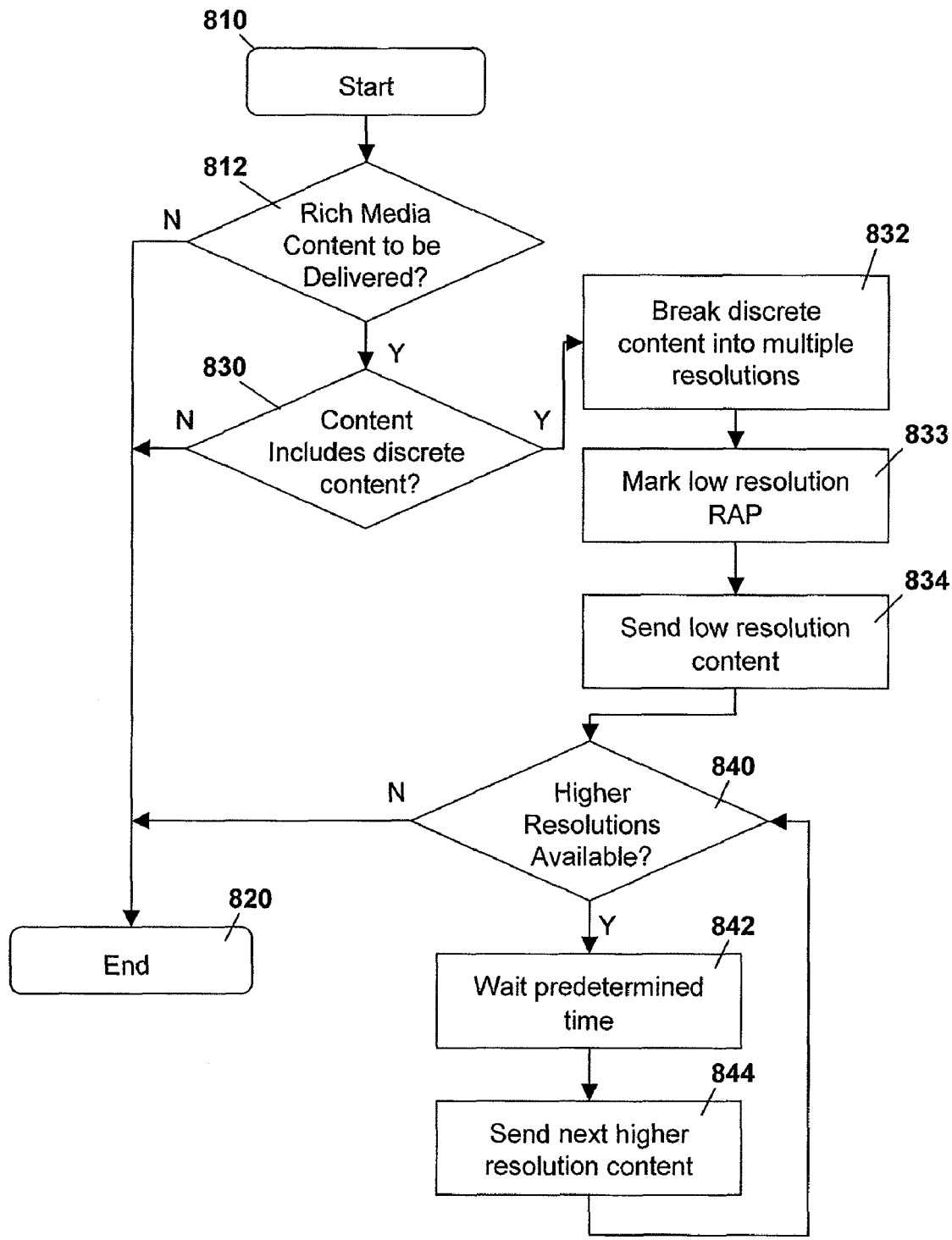
FIG. 8 is a flow diagram showing an alternative process for sending progressive resolutions from a network element including adding reliability to the low-resolution images.

Reference is now made to FIG. 8. FIG. 8 is the same as FIG. 6 with the exception of added step 833. In particular, the process starts at 810 and checks whether there is rich media content to be delivered in step 812. If not, the process ends at step 820.

If there is rich media content to be delivered, the process proceeds from step 812 to step 830 to check whether the content includes discrete content.

From step 830, if there is no discrete content the process proceeds to step 820 and ends. Otherwise, the process proceeds to step 832 in which the process optionally breaks the discrete media into multiple resolutions.

Added step 833 marks the low-resolution version of the discrete media as RAP and thus the packets are encoded with high Forward Error Correction to increase the reliability of the content in the event of an unreliable transport channel.

The process then proceeds to step 834 in which the low-resolution version of the discrete media is sent.

At step 840 a check is made to determine whether higher resolutions are available and, if yes, the process proceeds to step 842 in which it waits a predetermined time before proceeding to step 844, where the next higher resolution content is sent. As will be appreciated, the next higher resolution content in step 844 is not marked as RAP.

Figure 7:
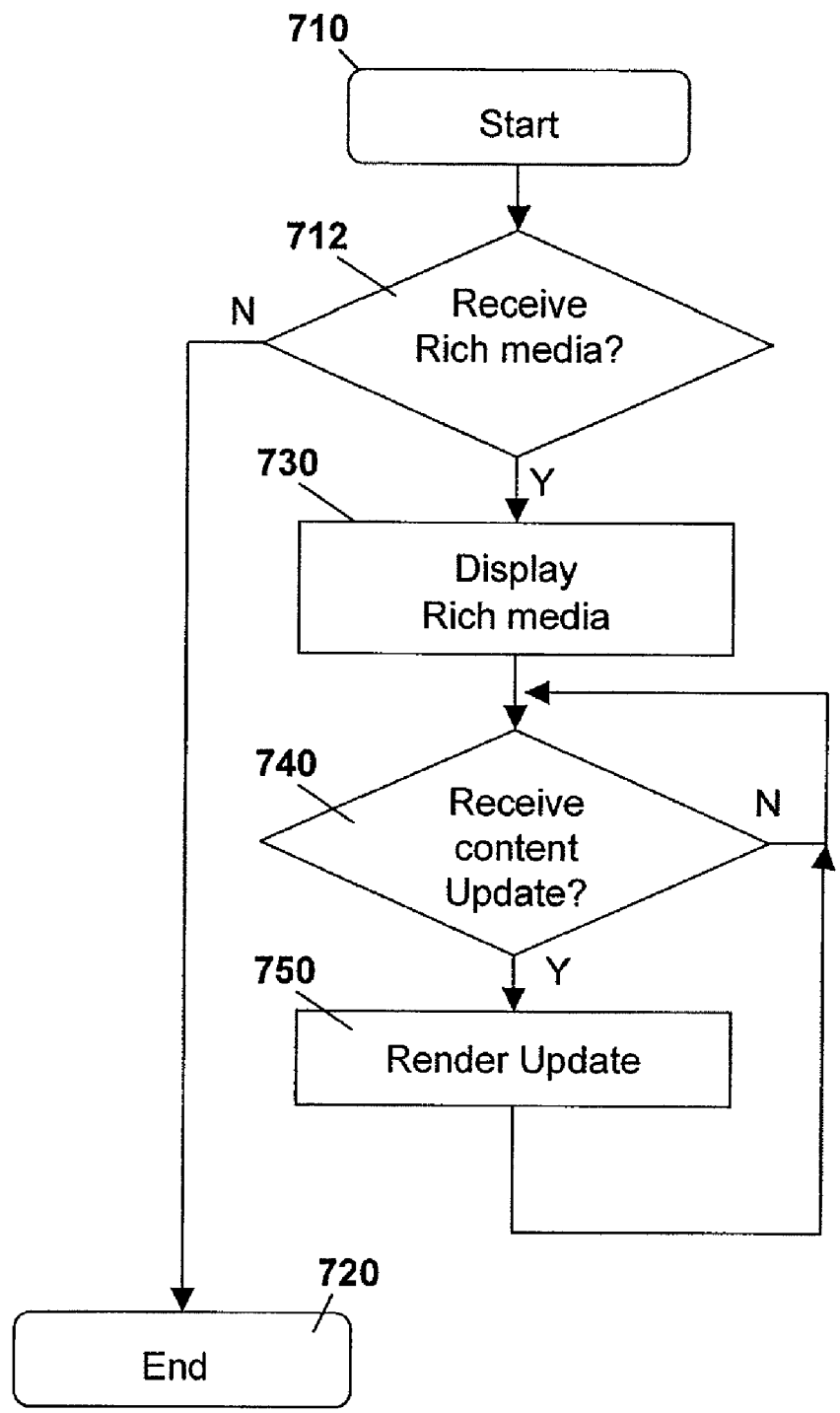
FIG. 7 is a flow diagram showing a mobile device side process for receiving progressive resolution updates.

From the mobile device prospective FIG. 7 still is applicable except that at step 712 and step 730 the Forward Error Correction is utilized to ensure that the packets are received reliably.

In a further embodiment, it may be desirable to limit transmission to a low quality subset of discrete content and not transmit higher resolution fragments of the discrete content. In particular, when a user is roaming, data transfer is often more costly. The user may still want to consult rich-media content without paying the full cost. In particular, some raster images are significant and are not only an improvement for the text message. The initial low resolution version in this case can be transmitted but subsequent fragments of the raster images might not be provided unless a specific user action such as making a request for the improvement is provided.

Similarly, the delivery of subsequent chunks of the raster images may be put on hold when the device resources reach some limit such as low battery, memory full, among others.

In some embodiments, a signal may be sent to the user by a specific message or it may be up to the user to define or select such policies as part of the user preferences.

In further embodiments, it could be the service provider or content provider who decides whether certain images should only be sent as low quality. For example, particular images may deserve to receive two resolutions worth of rendering, whereas others may need only the lowest resolution in a particular condition.

Similarly, some raster images may require the entire image to be loaded due to particular content provider policies. For example, a logo or advertising content may be required to be transferred in its entire resolution.

Figure 9:
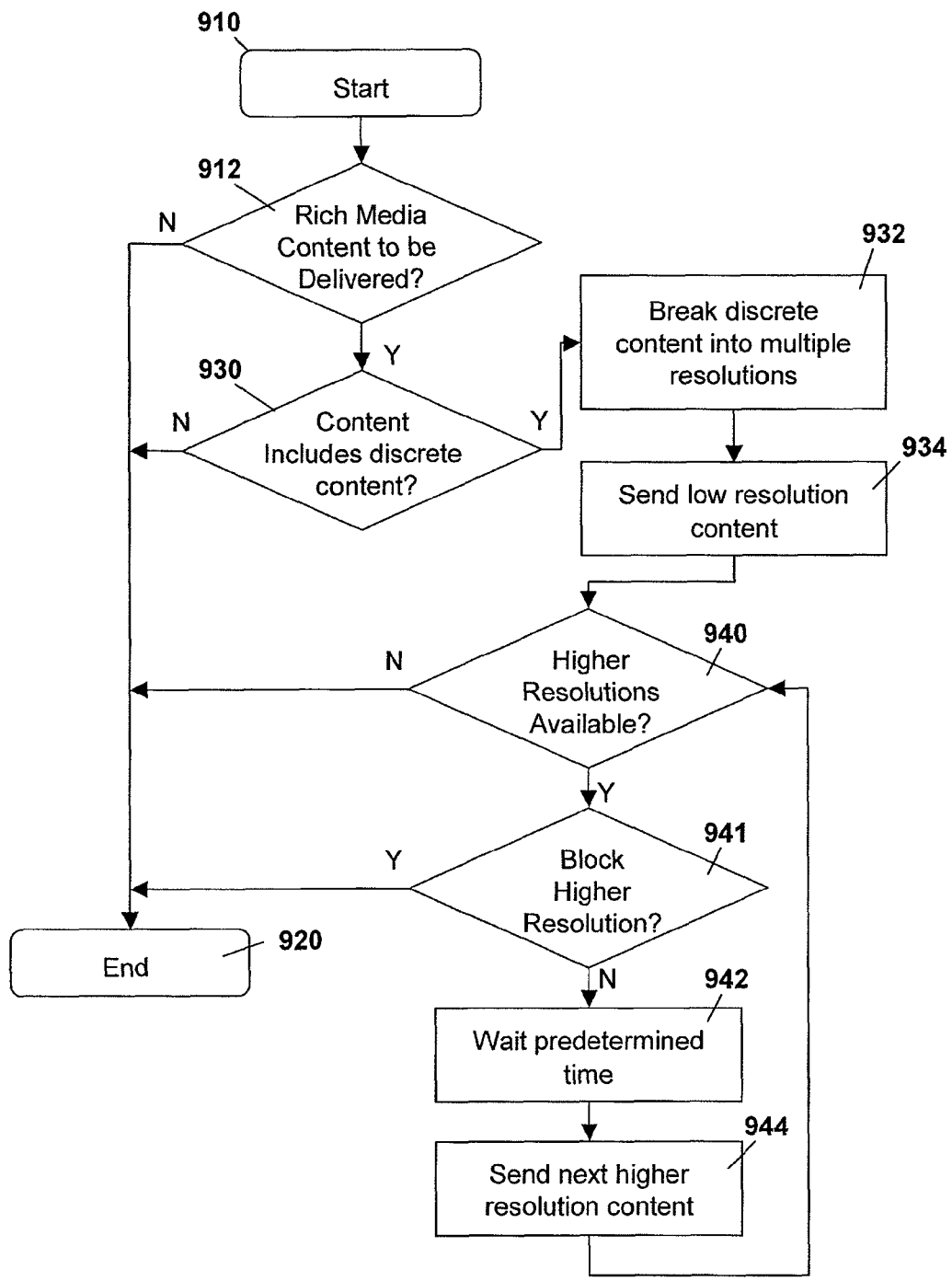
FIG. 9 is a flow diagram showing an alternative process for sending progressive resolutions from a network element including blocking high resolutions.

Reference is now made to FIG. 9. FIG. 9 shows a flow diagram from a network prospective in which the above is implemented. FIG. 9 is the same as FIG. 6 above with the exception that step 941 has been added. In particular, the process starts at 910 and proceeds to step 912 in which a check is made to see whether rich media content needs to be delivered. If no the process ends at step 920.

Otherwise, the process proceeds to step 930 in which a check is made to see whether the rich media includes discrete content such raster images. If no, the process proceeds to step 920 and ends. Otherwise the process proceeds to step 932 and optionally breaks the discrete media into multiple resolutions.

At step 934 the low resolution content is sent to the mobile device and the process then proceeds to step 940.

At step 940 a check is made to see whether higher resolution content is available. If yes, the process proceeds to step 941 in which a check is made to determine whether a block should be put onto high-resolution images. As indicated above, this could be based on user preferences, device limitation, network or carrier preferences. It could also be based on a prompt to the user and include various network conditions such as whether the user is roaming or not.

If it is determined in step 941 that a block should be put onto high-resolution fragments of the images the process proceeds to step 920 and ends. Otherwise the process proceeds to step 942 and potentially waits a predetermined time before sending the next higher resolution content in step 944.

From step 944 the process proceeds back to step 940 and continues to loop until either no higher resolution fragments are available or the next higher resolution fragments should be blocked.

In further embodiments, the progressive transmission of further chunks of a raster image or discrete media could be based on a time notion. In particular, some images may be present in some menus on the screen with which a user will interact. When interacting, the user will see another menu or screen without the possibility of coming back to the previous screen. It is therefore beneficial to deliver successive chunks of images on a time basis. Thus, if the user remains on a screen for more then a given time the subsequent chunk is delivered. If not, only the first chunk is delivered.

If the user is not interacting, the server can generate and deliver chunks based on other user conditions such as: whether or not the user device is roaming, resource limitations, no input from the user, commands to push or the device is in a background mode, among others.

One or more of these factors could be considered in step 941.

In addition, the image fragments could be created based on the scene and scene update weight. In particular, the initial low resolution version of the image could be lower or equal to the weight of the scene to ensure good synchronization. The subsequent segmentation may be done based on scene weight or update weight.

Further, the next fragment could be delivered as an update following a user request for a better quality. This update may contain only this fragment.

As will be appreciated, the above applies for synchronization of raster images to rich media content such as: LASeR, DIMS or RME and non-synchronized raster images provided in any kind of content such as HTML or equivalent.

In a further embodiment, the proposed method may be implementing using HTML 5 server-sent DOM events. As will be appreciated by those in the art, the server sent DOM events specification describes a technique for allowing servers to send DOM events to client documents.

The update commands described above, which carry the image data chunks to enhance the image quality can be mapped to the W3C DOM mutation events such as: DOMNodeInserted, DOMNodeRemoved, DOMAttrModified, among others. In other words, a rich media system can also be implemented by dispatching remote DOM events to update the rich media scene as opposed to commands.

As could be appreciated, the implementation of the above using DOM events will fall squarely within FIG. 6 in which steps 634 and 644 could be implemented utilizing the DOM events. Similarly, on the device side, referring to FIG. 7, steps 712 and 740 could recognize DOM events when rendering the rich media scene and updates.

As will be appreciated by those skilled in the art, the processes above could be implemented by any network element. A simplified architecture for a network is illustrated with reference to FIG. 10.

Figure 10:
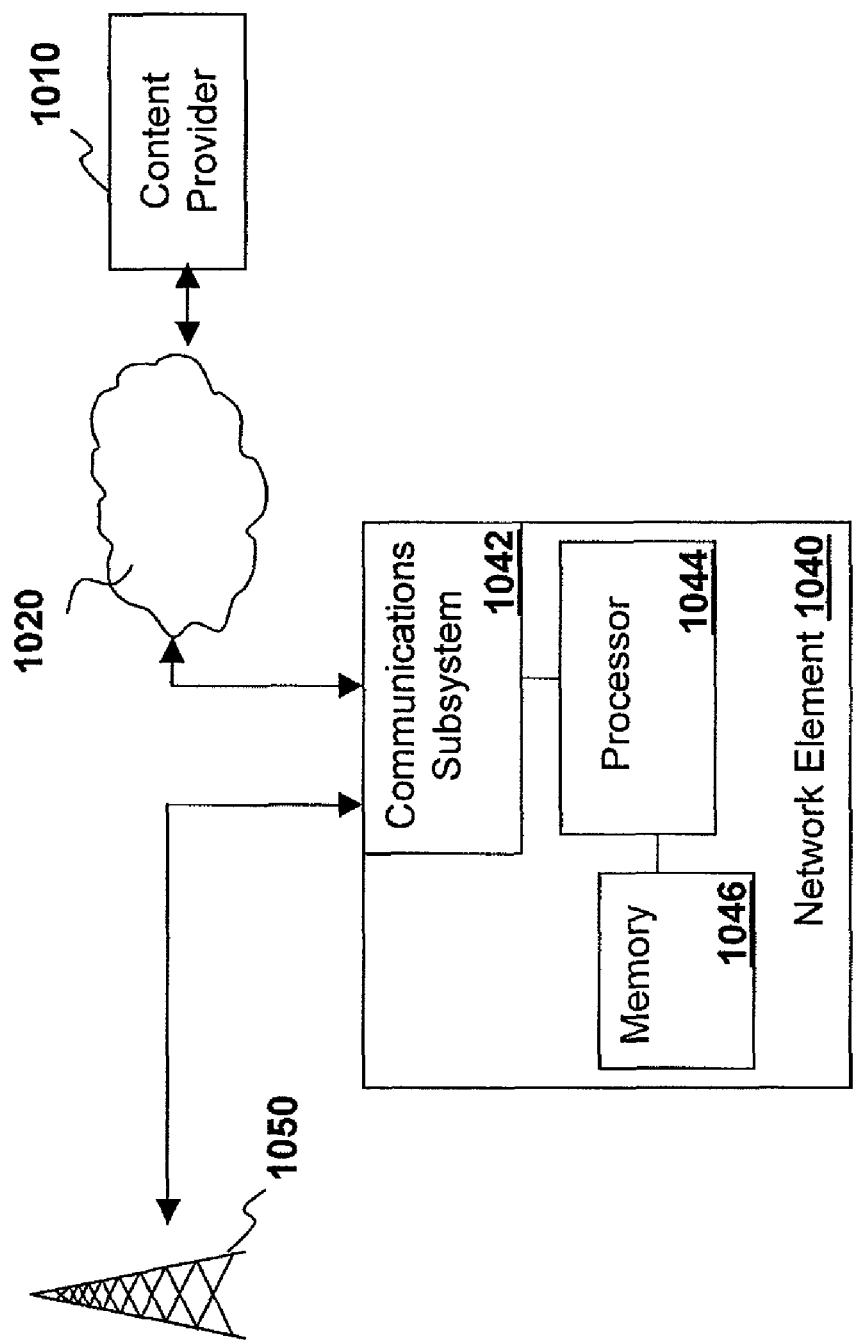
FIG. 10 is an exemplary network diagram showing a simplified network element.

In FIG. 10 a content provider 1010 provides the rich media content that a mobile device user wishes to display. Rich media content is sent through a network 1020 to a network element 1040.

As illustrated in FIG. 10 simplified network element 1040 includes at least a communications subsystem 1042 adapted to communicate with the network 1020 and further adapted to communicate with a mobile network 1050 as described below.

Information received at communications subsystem 1042 is forwarded to a processor 1044, which is adapted to perform the processes above on the data. For example, if the data includes rich media content having discrete content that needs to be broken into various resolutions, this would be done at processor 1044.

Processor 1044 is further adapted to designate low resolution packets as RAP packets, to change the RTP header to indicate whether progressive updates are going to be received, among other functionality.

Memory 1046 is adapted to store various elements and communicate with processor 1044. Memory 1046 can for example store the resolution images that are created by processor 1044.

Mobile network 1050 could be any network including but not limited to: the global system for mobile communications (GSM), general packet radio service (GPRS), code division multiple access (CDMA), universal mobile telecommunications system (UMTS), wideband code divisional multiple access (WCDMA) among others. These technologies allow the use of voice, data or both at the same time.

As will be appreciated, the above can be implemented on any mobile device. One exemplary mobile device is described below with reference to FIG. 11. This is not meant to be limiting, but is provided for illustrative purposes.

Figure 11:
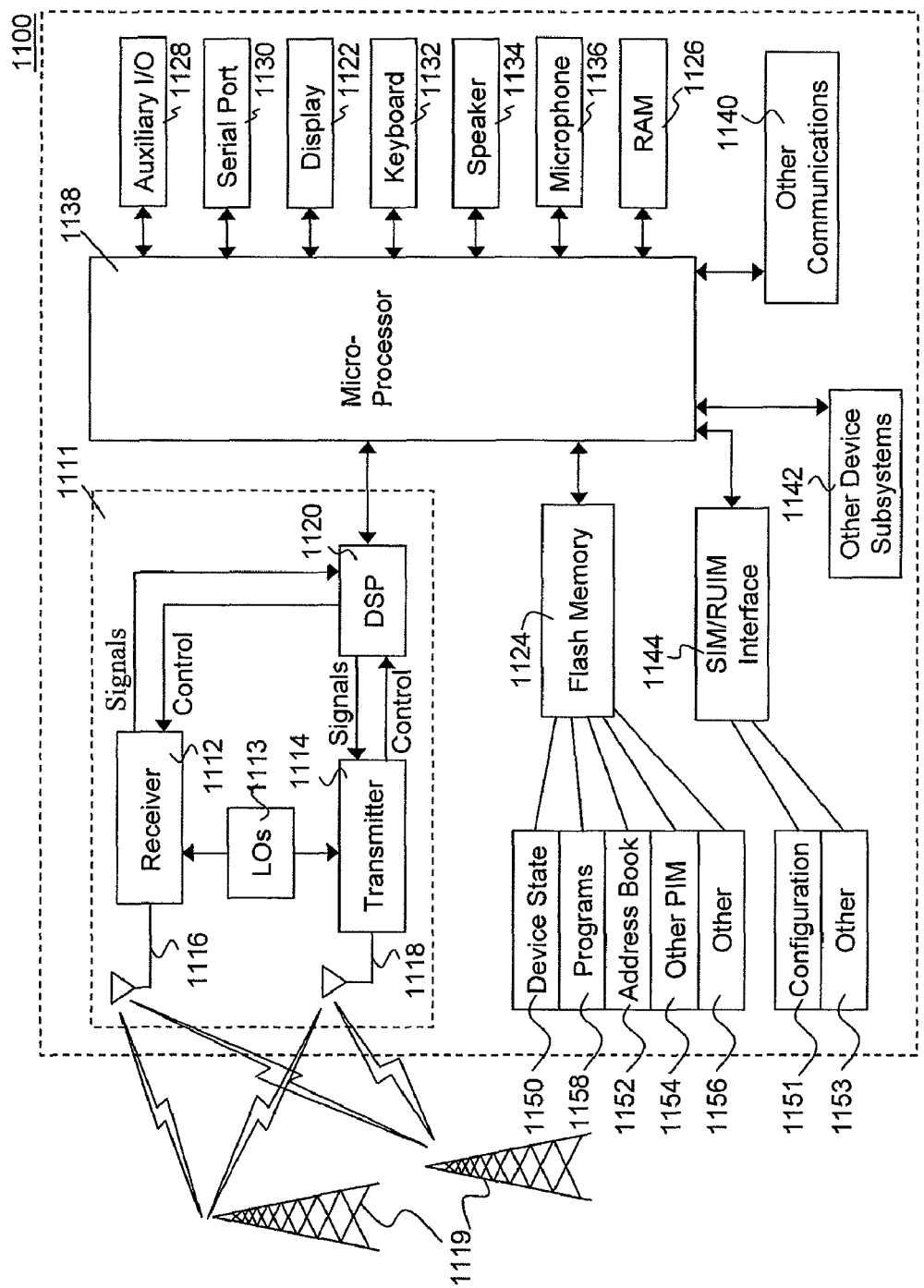
FIG. 11 is a block diagram showing an exemplary mobile device.

FIG. 11 is a block diagram illustrating a mobile device apt to be used with preferred embodiments of the apparatus and method of the present application. Mobile device 1100 is preferably a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate.

Network access requirements will also vary depending upon the type of network 1119. In some CDMA networks network access is associated with a subscriber or user of mobile device 1100. A CDMA mobile device may require a removable user identity module (RUIM) or a subscriber identity module (SIM) card in order to operate on a CDMA network. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile device 1100 may send and receive communication signals over the network 1119. As illustrated in FIG. 11, network 1119 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 1116 through communication network 1119 are input to receiver 1112, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Mobile device 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on mobile device 1100 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile device 1100.

In a data communication mode, a received signal such as a text message or web page download will be processed by the communication subsystem 1111 and input to the microprocessor 1138, which preferably further processes the received signal for element attributes for output to the display 1122, or alternatively to an auxiliary I/O device 1128.

A user of mobile device 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would preferably be output to a speaker 1134 and signals for transmission would be generated by a microphone 1136. Alternative voice or audio I/O subsystems, such as a voice message recording subsystem, may also be implemented on mobile device 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type mobile device for which synchronization with a user's desktop computer (not shown) may be desirable, but is an optional device component. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the mobile device to a computer to act as a modem.

Other communications subsystems 1140, such as a short-range communications subsystem, is a further component which may provide for communication between mobile device 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may also be used for WiFi communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for sending rich media comprising:
checking whether the rich media includes an item of discrete content that is at least one of an image, an item of audio media, or an item of video media;
sending a low resolution version of the discrete content as a part of the rich media responsive to the checking; and
subsequently sending after a predetermined non-zero waiting time a higher resolution fragment of the discrete content as an update to the rich media.

2. The method of claim 1 further comprising, prior to sending the low resolution version, breaking the discrete content into multiple resolutions.

3. The method of claim 1 wherein the sending the low resolution version of the discrete content synchronizes the discrete content with other elements in the rich media.

4. The method of claim 1 wherein the higher resolution fragment of the discrete content is used incrementally to update the low resolution version of the discrete content.

5. The method of claim 1 wherein the low resolution version of the discrete content and the higher resolution fragment of the discrete content are sent in band or out of band.

6. The method of claim 1 wherein the sending the low resolution version and sending the higher resolution fragment are performed through unicast.

7. The method of claim 1 wherein the sending the low resolution version and sending the higher resolution fragment are performed through broadcast.

8. The method of claim 1 further comprising checking whether the higher resolution fragment should be sent, and if no, blocking the sending the higher resolution step.

9. The method of claim 8 wherein the checking step utilizes rules and policies set at a network element.

10. The method of claim 9 wherein the checking step utilizes one or more factors selected from the group consisting of: whether a mobile device receiving the rich media is roaming; a network connection to the mobile device is available; whether a user has requested the higher resolution fragment; whether a time basis permits the higher resolution fragment; scene update weight; memory available on the mobile device; battery life of the mobile device; content provider preferences with respect to delivery of rich media; and service provider preferences with respect to delivery of rich media.

11. The method of claim 1 wherein the sending of the low resolution version is done using an increased reliability format.

12. The method of claim 11 wherein the increased reliability format is Random Access Point supported with higher Forward Error Correction.

13. The method of claim 1 wherein the sending the higher resolution fragment is repeated until a full resolution fragment is sent.

14. The method of claim 1 wherein the low resolution version of the discrete content and the higher resolution fragment of the discrete content are sent using a Document Object Model event.

15. The method of claim 1 wherein the low resolution version of the discrete content and the higher resolution fragment of the discrete content are sent using LASeR commands.

16. The method of claim 1 wherein a real-time transport protocol header is modified to indicate progressive delivery of discrete content.

17. The method of claim 1 wherein the discrete content is a raster image.

18. A network element for sending rich media comprising:
a communications subsystem adapted to receive the rich media;
a processor adapted to check whether the rich media includes discrete content;
the processor adapted to send, responsive to the check and through the communications subsystem, a low resolution version of the discrete content as part of the rich media;
the processor adapted to wait a non-zero predetermined period responsive to the sending of a low resolution version of the discrete content with the rich media; and
the processor adapted to subsequently send a higher resolution fragment of the discrete content through the communications subsystem in response to waiting the predetermined period.

19. The network element of claim 18 wherein the processor is further adapted to break the discrete content into multiple resolutions.

20. The network element of claim 18 wherein the higher resolution fragment of the discrete content is incrementally applied to the low resolution version of the discrete content.

21. The network element of claim 18 wherein the low resolution version of the discrete content and the higher resolution fragment of the discrete content are sent in-band or out-of-band.

22. The network element of claim 18 wherein the processor is adapted to check whether the higher resolution fragments should be sent, and if no, block the sending the higher resolution step.

23. The network element of claim 22 wherein the network element further includes memory storing rules and policies for said processor to use in said checking step.

24. The network element of claim 23 wherein the processor utilizes one or more factors for checking, the factors selected from the group consisting of: whether a mobile device receiving the rich media is roaming; a network connection to the mobile device is available; whether a user has requested the higher resolution version; whether a time basis permits the higher resolution fragments; scene update weight; memory available on the mobile device; battery life of the mobile device; content provider preferences with respect to sending rich media; and service provider preferences with respect to sending rich media.

25. The network element of claim 18 wherein the processor encodes the low resolution version utilizing an increased reliability format.

26. The network element of claim 25 wherein the increased reliability format is a Random Access Point supported by a higher Forward Error Correction.

27. The network element of claim 18 wherein the processor and communications subsystem are adapted to repeat the sending of higher resolution fragments until a full resolution fragment is sent.

28. The network element of claim 18 wherein the low resolution version of the discrete content and the higher resolution fragment of the discrete content are sent using a Document Object Model event.

29. The network element of claim 18 wherein the low resolution version of the discrete content and the higher resolution fragment of the discrete content are sent using LASeR commands.

30. The network element of claim 18 wherein a real-time transport protocol header is modified to indicate progressive delivery of discrete content.

31. The network element of claim 18 wherein the discrete content is a raster image.

32. A method for receiving rich media comprising:
receiving a low resolution version of an item of discrete content that is an image in the rich media;
rendering the rich media;
receiving a higher resolution fragment of the discrete content after a non-zero predetermined period after receiving the low resolution version of the discrete content in the rich media; and
using the higher resolution fragment to incrementally update the low resolution version of the discrete content.

33. The method of claim 32 wherein the higher resolution fragment of the discrete content is received and applied incrementally to the low resolution version of the discrete content.

34. The method of claim 32 wherein the low resolution version of the discrete content and the higher resolution fragment of the discrete content are received in band or out of band.

35. The method of claim 32 wherein the receiving of the low resolution version and the higher resolution fragment are done through unicast or broadcast.

36. The method of claim 32 further comprising sending information to a network element indicating whether the higher resolution fragment of the discrete content should be sent from the network element.

37. The method of claim 36 wherein the information includes one or more factors selected from the group consisting of: whether a mobile device is roaming; a network connection to the mobile device is available; whether a user has requested the higher resolution discrete content; whether a time basis permits the higher resolution discrete content; scene update weight; memory available on the mobile device; and battery life of the mobile device.

38. The method of claim 32 wherein the low resolution version of the discrete content is received with an increased reliability format.

39. The method of claim 32 wherein the low resolution version and the higher resolution fragment of the discrete content are received using a Document Object Model event.

40. The method of claim 32 wherein the low resolution version and the higher resolution fragment of the discrete content are received using a LASeR commands.

41. The method of claim 32 wherein the rich media includes a real-time transport protocol header modified to indicate progressive delivery of discrete content.

42. A mobile device for receiving rich media comprising:
a communications subsystem adapted to receive low resolution discrete content in the rich media and higher resolution discrete content; and
a processor adapted to:
render the rich media;
wait at least a non-zero predetermined time after receiving the low resolution discrete content before receiving the higher resolution discrete content; and
increment the low resolution version of the discrete content with higher resolution fragment of the discrete content.

43. The mobile device of claim 42 wherein the higher resolution fragment of the discrete content is received by the communications subsystem and incrementally applied to the low resolution version of the discrete content.

44. The mobile device of claim 42 wherein the low resolution version of the discrete content and the higher resolution fragment of the discrete content are received in band or out of band.

45. The mobile device of claim 42 wherein the receiving of the low resolution version and the higher resolution fragment is done utilizing unicast or broadcast.

46. The mobile device of claim 42 wherein the processor is further adapted to send, using the communications subsystem, information to a network element indicating whether the higher resolution fragments of the discrete content should be sent from the network element.

47. The mobile device of claim 46 wherein the information includes one or more factors selected from the group consisting of: whether a mobile device is roaming; a network connection to the mobile device is available; whether a user has requested the higher resolution fragments discrete content; whether a time basis permits the higher resolution discrete content; scene update weight; memory available on the mobile device; and battery life of the mobile device.

48. The mobile device of claim 42 wherein the low resolution discrete content is received with an increased reliability format.

49. The mobile device of claim 42 wherein the low resolution version and the higher resolution fragment of the discrete content are received using a Document Object Model event.

50. The mobile device of claim 42 wherein the low resolution version and the higher resolution of the discrete content are received using LASeR commands.

51. The mobile device of claim 42 wherein the rich media includes a realtime transport protocol header modified to indicate progressive delivery of discrete content.

* * * * *